Jan. 25, 1955 W. R. PETERSON ET AL 2,700,478
ENSILAGE REMOVING MECHANISM FOR MECHANIZED
DAIRY ESTABLISHMENTS
Original Filed Aug. 29, 1947 5 Sheets-Sheet 2

INVENTORS.
Walter R. Peterson
Adelbert C. Radtke
BY
Paul O. Pippel
Atty.

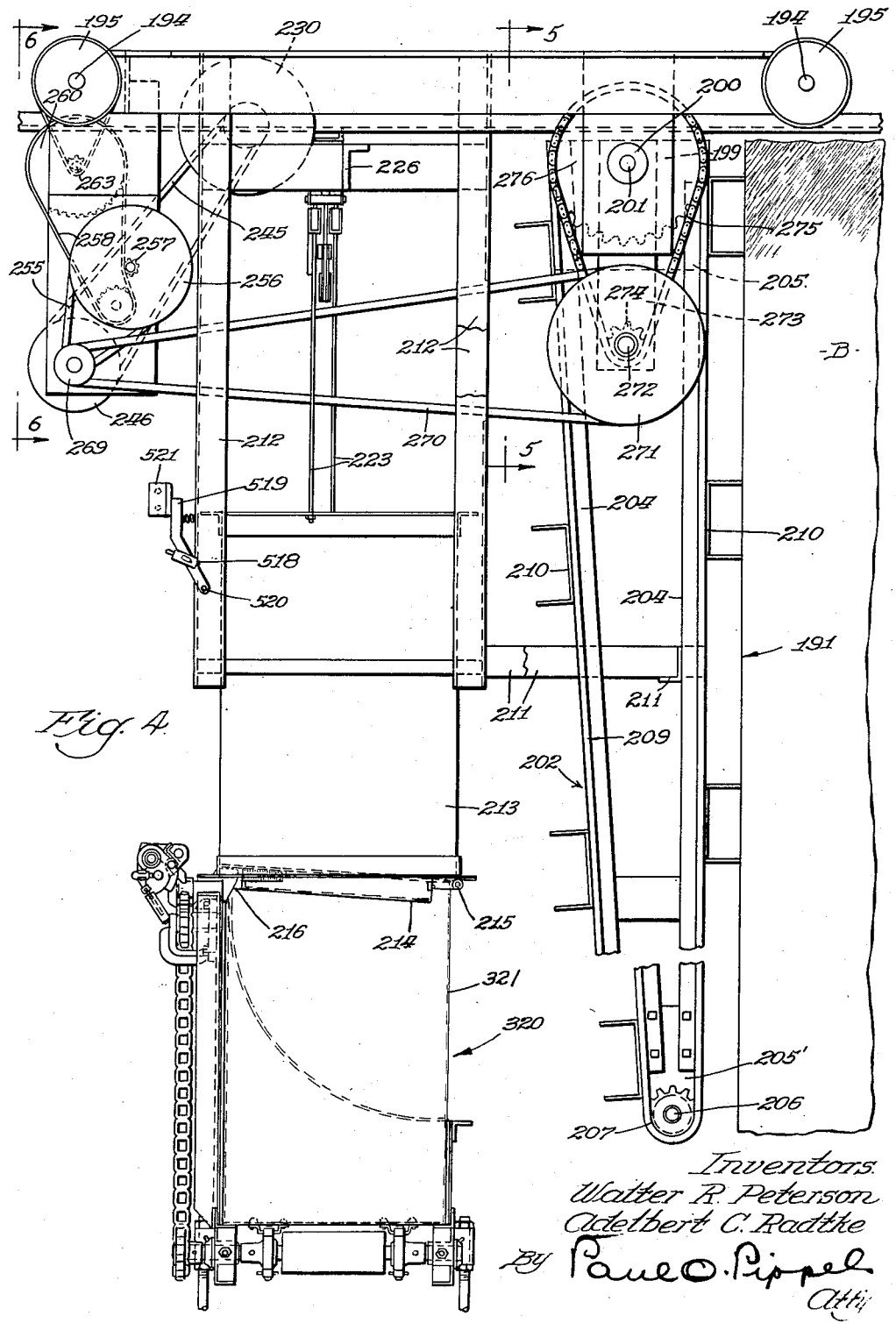

Jan. 25, 1955 W. R. PETERSON ET AL 2,700,478
ENSILAGE REMOVING MECHANISM FOR MECHANIZED
DAIRY ESTABLISHMENTS
Original Filed Aug. 29, 1947 5 Sheets-Sheet 4
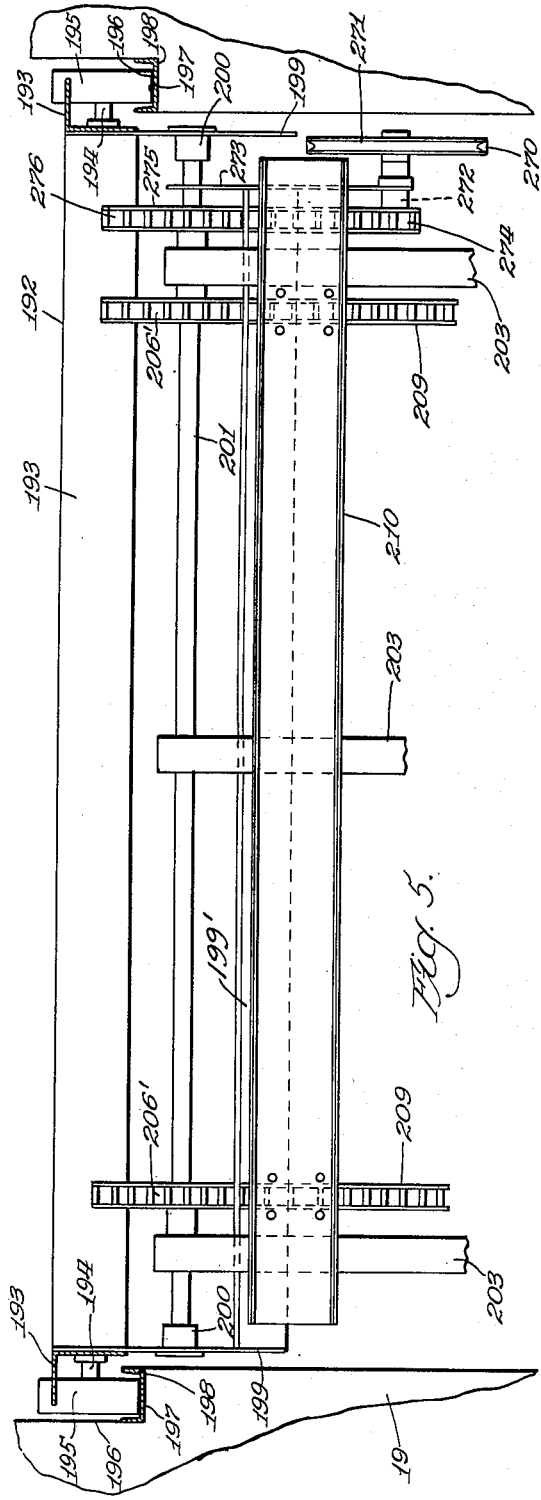
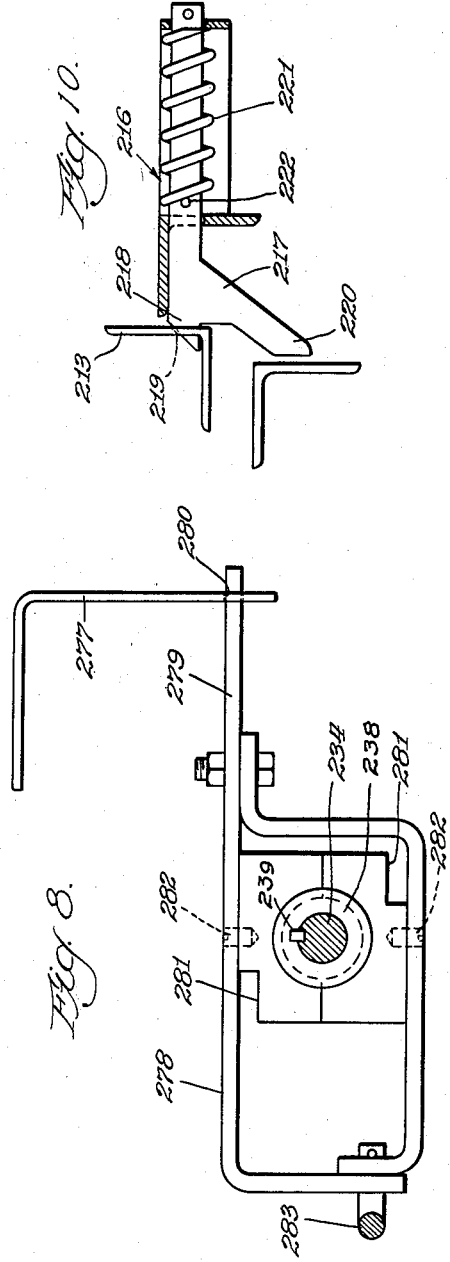
Inventors:
Walter R. Peterson
Adelbert C. Radtke
By Paul O. Pippel
Atty.

Jan. 25, 1955   W. R. PETERSON ET AL   2,700,478
ENSILAGE REMOVING MECHANISM FOR MECHANIZED
DAIRY ESTABLISHMENTS
Original Filed Aug. 29, 1947   5 Sheets-Sheet 5
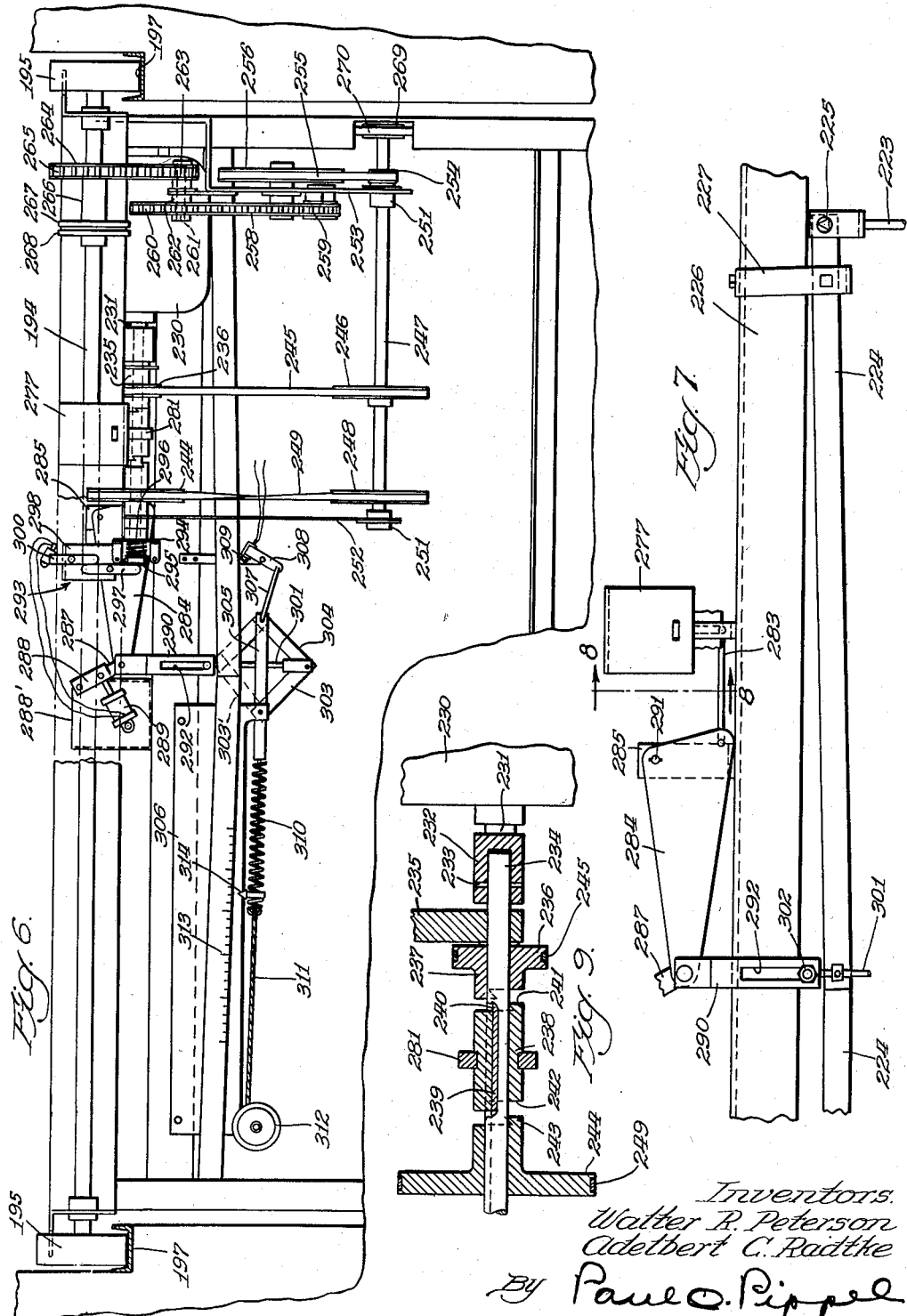
Inventors.
Walter R. Peterson
Adelbert C. Radtke
By Paul O. Pippel
Atty.

United States Patent Office 2,700,478
Patented Jan. 25, 1955

2,700,478

ENSILAGE REMOVING MECHANISM FOR MECHANIZED DAIRY ESTABLISHMENTS

Walter R. Peterson, Hinsdale, and Adelbert C. Radtke, Oak Park, Ill., assignors to International Harvester Company, a corporation of New Jersey Original application August 29, 1947, Serial No. 771,250. Divided and this application December 21, 1950, Serial No. 202,071

9 Claims. (Cl. 214—2)

This application is a division of applicants' copending application relating to a Mechanized Feeding Mechanism for Dairy Establishments, Serial No. 771,250, filed August 29, 1947, and now Patent No. 2,654,344. The invention disclosed in this divisional application pertains to a novel ensilage removing mechanism designed to remove predetermined amounts of ensilage from a trench silo for delivery to a mechanized feeding barn.

One of the most tedious chores in the feeding operation is the removal of ensilage from the silo. This is usually necessary before any feeding operation can take place.

The ensilage which is an important element in any feeding operation usually is stored in a vertical silo which is immediately adjacent the barn, or in a trench silo generally removed some distance from the barn. A good portion of the trench silo is usually beneath the surface of the ground and can be filled by merely dumping ensilage into the confines of the same from the top thereof. Any power shovel or other material moving implement may be utilized for this purpose.

The vertical silo, on the other hand, requires the elevating of the ensilage to the top thereof by a power blower or other elevating means. In either type of silo the greatest difficulty is the removal of ensilage therefrom. In the vertical silo the farmer finds it necessary to make a hazardous climb to the top thereof and then manually throw the ensilage down onto the ground. In the trench silo the farmer generally also has to pitch fork the ensilage to the surface of the ground adjacent the silo, or into a wagon or truck.

On a farm where the farmer has only one silo, the storage of his ensilage presents a considerable problem. The maturing season of the various crops differs and therefore they are harvested at different periods of time. In a vertical silo therefore the farmer would have to pack his grass ensilage at the lower part of the silo. Consequent layers in the silo would be made up of different types of grasses and during the latter portion of the season of different types of crops. Therefore, it can be readily understood that the farmer would have a silo packed with different types of ensilage, each layer constituting a different type of feed. Since in conventional constructions the removal of silage takes place from the top of the silo, the corn ensilage would have to be removed first. Subsequent layers would thereupon be removed as needed. It is readily apparent therefore that if the farmer followed this procedure the dairy animals would be subjected to mid-season changes of feeding.

It is generally recognized in the industry that mid-season changes of feed are undesirable in that dairy cows generally respond unfavorably to such a procedure. It is much more desirable to feed the animal a steady and unchanging diet which has the effect of promoting greater production and better quality in the final product. Since the farmer recognizes this undesirable effect of feeding, he thereupon must find a different process for storing his ensilage. This may require several vertical silos or the addition of a trench silo. Applicants have provided a trench silo where the feed may be stored in layers without the disadvantage of having mid-season changes of feed. It is one of applicants' prime objects to provide a silo having mechanized means for removing the ensilage therefrom, the means being arranged to remove vertical sections of ensilage from the silo containing layers of different kinds of silage, therefore obtaining a consistent blend of ensilage. Since the cows therefore are fed the same blend throughout the year, the undesirable results of mid-season feeding changes are eliminated.

It is a major object to provide a dairy barn arranged with a trench silo immediately adjacent thereto, one of the walls of said barn also serving as one wall of the trench silo.

Another object is an improved ensilage unloading device for a trench silo, the unloading device including a vertical moving endless elevator for removing vertical sections of ensilage from packed horizontal layers of ensilage within the trench silo.

A still further object is to provide an unloading device for a trench silo, said unloading device including automatic means for loading ensilage into a hopper, said hopper being movable with said unloading device to a position above a belt conveyor arranged to receive the ensilage from the hopper upon the automatic dumping of the same.

These and other objects will become more readily apparent upon a reading of the description when examined in conjunction with the accompanying drawings.

In the drawings:

Fig. 3 is a sectional view of a removable manger belt taken along the line 3—3 of Figure 1, this view showing the relation of the manger belt with respect to the floor of the barn.

Fig. 4 is a side elevational view of an ensilage elevator showing its relation to a quantity of ensilage packed within a trench silo.

Fig. 5 is a sectional view of a driving means for an ensilage elevating mechanism generally taken along the line 5—5 of Fig. 4.

Fig. 6 is a view showing the driving mechanism and reversing mechanism for an ensilage elevating device generally taken along the line 6—6 of Fig. 4.

Fig. 7 is an enlarged detail view showing the relationship of the various parts of a reversing mechanism for an ensilage elevating device.

Fig. 8 is a sectional view taken along the line 8—8 of Fig. 7.

Fig. 9 is an enlarged sectional view of certain parts included in the reversing mechanism shown in Figs. 6 and 7.

Fig. 10 is a detail view of a latch and release mechanism for the hopper of an ensilage elevating mechanism.

Figure 1:
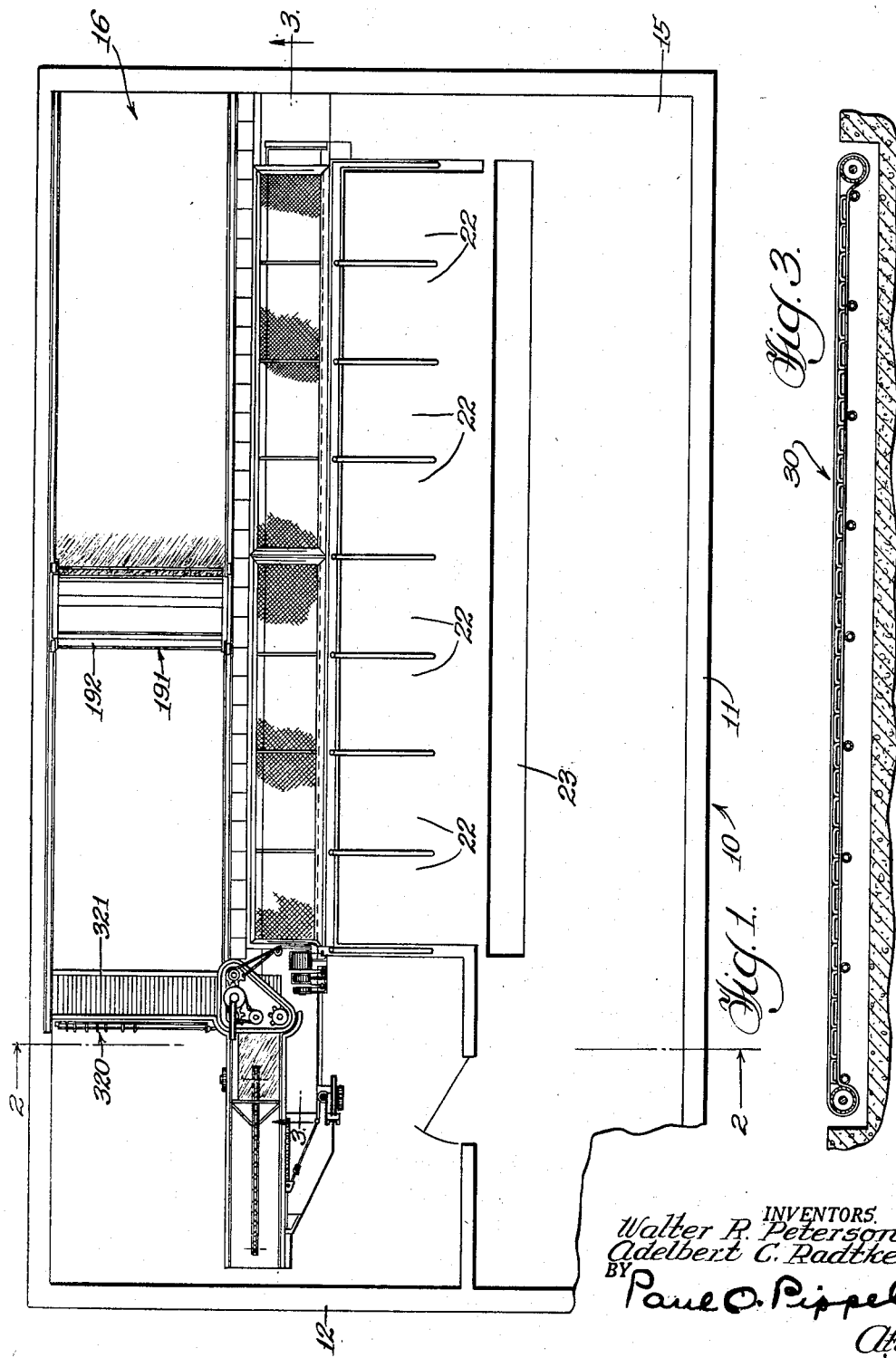
Fig. 1 is a dairy barn having its roof removed therefrom to show in plan view a mechanized feeding mechanism for supplying feed to the animals situated within the barn, some of the objects within this barn being shown in section to better illustrate the invention.
Figure 2:
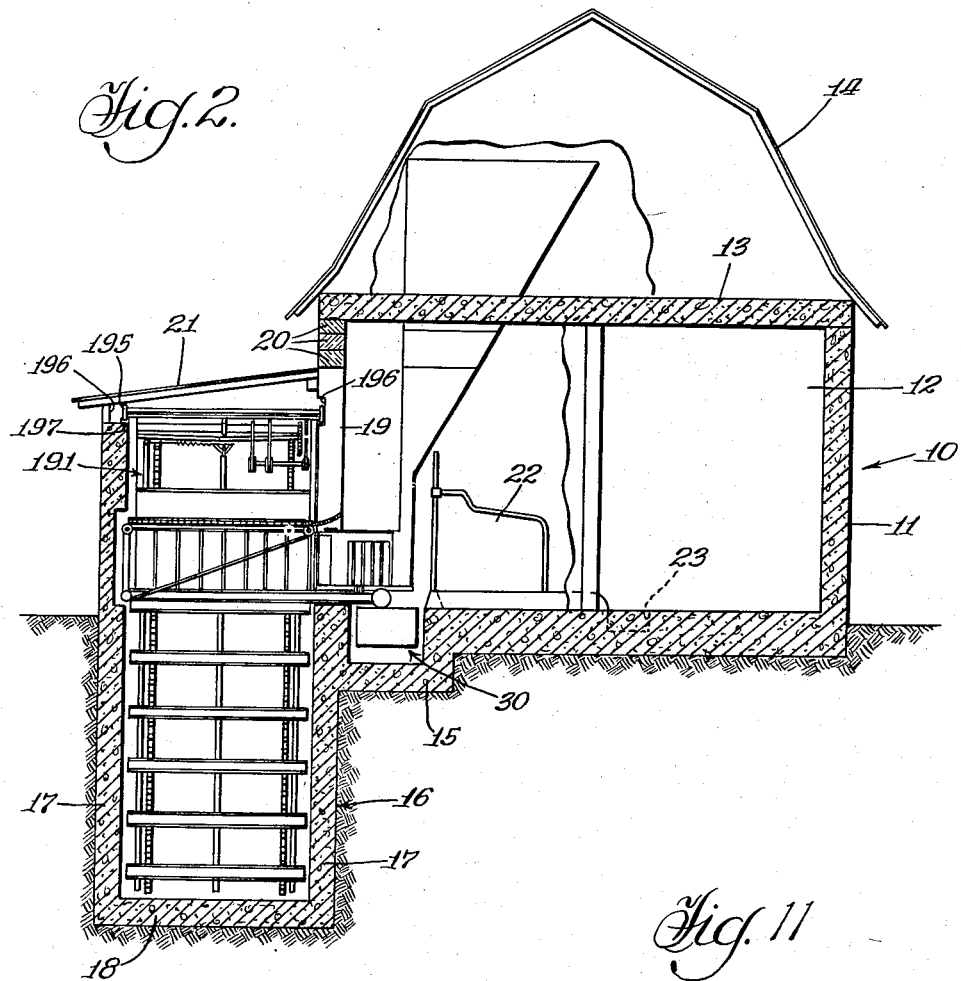
Fig. 2 is a sectonal end view of the barn and feeding mechanism therein taken along the line 2—2 of Fig. 1.

The dairy establishment with which the present invention is concerned includes a barn structure generally indicated by the reference character 10 as best shown in Figures 1 and 2. This type of barn structure is constructed to house a mechanized feeding unit for supplying feed to the dairy animals and consists generally of side walls 11, end walls 12, and an upper supporting floor 13 on which a roof 14 is supported. The construction generally is of concrete, thereby providing a solid fire-proof building. The lower floor is indicated by number 15. Immediately adjacent one side of the barn structure 10 a trench silo 16 is provided. The trench silo is constructed of vertical concrete walls 17 extending a considerable distance into the ground, where they are joined by a floor or bottom 18. A common vertical wall 19 serves as a wall for the trench silo and also for the barn. The silo therefore affords protection against weather thus protecting the common wall. The area adjacent this common wall, within the barn, is thus kept relatively warm during cold weather.

In order to properly permit light to enter the interior of the barn 10, a few courses of glass blocks 20 are laid between the wall 19 and the upper floor 13. An overlapping sectional metal roof 21 is placed over the trench silo, these roof sections being readily opened or removed if desired to supply ensilage to the silo.

As best shown in Figures 1 and 2, the barn 10 is provided with eight animal stalls 22. These stalls 22 are arranged near the warm side of the barn, adjacent the common wall 19. A gutter 23 is formed in the concrete floor 15 of the barn. An endless movable manger belt mechanism 30 is provided, this mechanism being described in detail in the parent application.

*The ensilage removal and elevating mechanism*

The ensilage removal and elevating mechanism is best shown in Figures 1, 2, 4, 5, 6, 7, 8 and 9. This ensilage removal mechanism is designated by the reference character 191 arranged within the trench silo 16 and is adapted to move longitudinally with respect thereto for removing packed ensilage therefrom. As shown in Figure 4 the packed ensilage is designated by the letter B. The packed ensilage B is packed within the silo in horizontal layers of different types and variations of feed. Grass ensilage is generally harvested during the earlier portion of summer and this ensilage forms the lower layers within the silo. Corn silage and other later crops are packed toward the top of the silo.

The ensilage removal and carrier mechanism 191 includes a rectangular frame structure 192. The frame structure 192 is constructed of transversely and longitudinally extending angle members 193 welded together to form a rigid structure. A pair of longitudinally spaced shafts 194 are journaled in the angle members 193 and extend outwardly with respect thereto. Each shaft 194 has pinned thereon a pair of spaced track rollers or wheels 195. The upper sides of the concrete walls 17 and 19 of the building structure and silo are cut out or recessed to form supporting shoulders 196.

The supporting shoulders 196 each support a longitudinally extending channel track section 197. The rollers 195 are arranged to ride upon these track sections as best shown in Figure 6. A pair of transversely spaced depending brackets 199 extend downwardly from the angle members 193. The brackets 199 support bearing members 200. The bearing members 200 rotatably support a transversely extending shaft 201.

An endless ensilage elevating mechanism 202 is suspended from the shaft 201 and cross frame 199'. The elevating mechanism 202 consists essentially of three transversely spaced guide members 203. Each guide member 203 consists of a pair of diverging angle members 204. The diverging members 204 are each connected at their upper ends to a depending plate 205 which is connected to the transverse shaft 201 and cross frame 199'. The lower ends of the angle members 204 are rigidly secured together by means of a plate 205'. The lower ends of the plates 205' support transversely extending shaft 206 as best shown in Figure 4. The shaft 206 has journaled thereon a pair of transversely spaced sprockets 207. Only one of these sprockets is shown in Figure 4, but it is to be understood that two of these sprockets are provided, each one being spaced adjacent the lower ends of the outer guide members 203.

Endless chains 209 are trained about the sprockets 206' and 207. A plurality of spaced scraper members 210 formed of channel sections are rigidly secured to the chains 209 for movement therewith. The scraper members 210, as best shown in Figure 5, are guided at their middle and end portions by means of the guide members 203.

As best shown in Figure 4 a pair of arms 211 are supported by the guide members 203 and extend longitudinally with respect thereto. The rectangular frame structure 192 has connected thereto at each side a plurality of downwardly extending supports or guide members 212. The arms 211 are also connected to a transversely extending member 211' which provides rigidity to the entire structure. The rearmost guide members 212 are rigidly connected to the longitudinally extending members 211. A rectangular hopper 213 is positioned between the guide members 212. The hopper 213 is provided at its lower end with a trap door 214 hingedly connected as indicated at 215.

As best shown in Figures 4 and 10, the latch mechanism 216 consists of a slidable member 217 having a hook portion 218 and a projecting portion 220. A spring 221 is in engagement with a pin 222 extending through the slidable member 217. The lower end of the hopper 213 is provided with a recess 219 which engages the hook portion 218. The spring 221 normally holds the hook portion 218 in engagement with said recess.

The hopper 213 is supported by means of a pair of links 223 which are connected at their upper ends to a pair of scale beams 224 forming part of a weighing mechanism as best shown in Figure 7. The scale beams 224 have their ends pivotally connected to a transversely extending member 226 forming part of the rectangular structure of which parts 212 are the corners. A bracket 227 serves as the pivotal fulcrum for the scale beams 224.

The rectangular frame structure 192, on which the hopper 213 is supported, and the elevating mechanism 202 are longitudinally movable with respect to the trench silo as previously indicated. The elevating mechanism is also arranged to remove vertical sections of the ensilage B. The drive mechanism for effecting movement of these parts consists generally of an electric motor 230 which is rigidly supported on the supporting structure 192. The electric motor 230 is provided with a driving shaft 231 which is engageable with a coupling member 232 as best shown in Figures 6 and 9. A pin 233 extends through the coupling member 232 and through a driven shaft 234. The driven shaft 234 is supported at one end in a bracket 235 which is suitably connected to a portion of the frame structure 192.

A V-belt pulley 236 is loosely journaled upon the shaft 234. The pulley 236 is provided with an extension forming a clutch face 237. Immediately adjacent the pulley 236 there is provided, on the shaft 234, a clutch member 238. The clutch member 238 has an inner projection or key 239 which is slidable in a key-way or kerf 240 formed in the shaft 234. Thus the clutch member 238 is driven with the shaft 234. The clutch member 238 is provided with clutch faces 241 and 242. The clutch face 241 is engageable with the clutch face 237 of the pulley 236. The clutch face 242 is engageable with a clutch face 243 formed at one side of a pulley 244. The pulley 244, similar to the pulley 236, is loosely journaled on the shaft 234.

As best shown in Figure 6, a V-belt 245 is driven from the pulley 236. The V-belt in turn drives a pulley 246 which is rigidly secured to a shaft 247. A pulley 248 is also rigidly secured to this shaft. This pulley 248 is driven by a twisted belt 249 which is driven by the pulley 244. The shaft 234 is constantly rotating with the motor 230. In order to effect movement of either of the pulleys 236 and 244 the clutch member 238 is placed in engagement with either of the clutch faces of said respective pulleys. The shaft 247 is journaled on bearing members 251 rigidly secured to depending brackets 252 and 253.

As best shown in Figures 4 and 6 a pulley 254 is rigidly secured in driving engagement with the shaft 247. The pulley 254 drives a belt 255 which is trained about a pulley 256 which drives a sprocket 257. The sprocket 257 is in driving engagement with a chain 258 which engages sprockets 259 and 260. The sprocket 260 is rigidly connected to shaft 261 which is journaled in a bearing member 262. A sprocket 263 is driven by the shaft 261 and this sprocket 263 drives a chain 264 for rotating a sprocket 265. The sprocket 265 is arranged to rotate a sleeve 266 journaled on the shaft 194. The sleeve 266 is provided at one end with a clutch face 267 which is in engagement with a clutch face 268 rigidly secured to the shaft 194. Rotating movement is thus imparted to the shaft 194 thereby driving one set of wheels 195 to move the mechanism longitudinally on the tracks 197.

As best shown in Figures 4 and 6 the end of the shaft 247 has secured for rotation thereon a pulley 269. The pulley 269 is in driving engagement with a belt 270. The belt 270 drives a pulley 271 rigidly secured to a shaft 272. The shaft 272 is carried on a depending bracket 273. The shaft 272 drives a sprocket 274 which rotates a chain 275 connected to a sprocket 276. The sprocket 276 drives the shaft 201, which in turn drives sprockets 206'. The chains 208 are thereby driven, thus effecting vertical movement of the scraper members 210.

It can now readily be seen that operation of the motor 230 is effective to drive the elevator mechanism vertically and to move the complete frame structure 192 longitudinally with respect to the trench silo.

As best shown in Figures 6, 7 and 8, a plate member 277 is rigidly secured to a portion of the supporting structure 192. An arm 278 extends transversely inwardly with respect to the plate member. The arm 278 is provided with an extension 279 which projects into a slot 280 formed in the plate member 277. The arm 278 is free to pivot angularly with respect to the slot 280. A pair of collars 281 encircle the clutch member 238. The collars 281 are secured to the arm 278 by means of pins 282. The outer end of the arm 278 is connected to a link 283. The link 283 is movable in a reciprocating manner to shift the arm 278 angularly, thereby moving the clutch member 238. As best shown in Figure 9 movement of the clutch member 238 along the shaft 234 provides for engagement with the clutch faces on the pulleys 236 and 244.

A triangularly shaped plate member 284 is connected at one of its ends to the link 283. The plate member 284 is pivotally connected to a bracket 285 supported on the elevator cross-frame structure. The plate member 284 is further pivotally connected to a link 287 which is pivotally connected with a link 288 to a bracket 288'. The links 287 and 288 and the plate member 284 form a toggle linkage which is actuated by means of a solenoid 289. A depending arm 290 is pivotally connected as indicated at 291 to the pivotal juncture of the plate member 284 with the link 287. The arm 290 has a vertical slot 292 which functions with the scale beam structure 224 as will presently be described.

A centrifugally operable switch is generally designated by the reference character 293. The switch 293 includes a pair of centrifugal weight members 294 which are pivoted to move a collar 295. The collar 295 is movable longitudinally with respect to the shaft 234 by means of a spring 296 which urges the weight members 294 to an inward or closed position when at rest. The switch 293 is of a conventional type and is connected in a conventional manner to the shaft 234 for rotation therewith. The collar 295 is adapted to engage a pivot arm 297 which is pivoted on a bracket 298. The arm 297 is also positioned to engage a second pivot member 299 which is also pivoted on a bracket 298. The pivoted arm 299 has mounted thereon a mercury switch 300 which may be actuated by angular movement of the arm 299. The switch 300 as shown in Figure 6 is in a closed position.

The ends of the scale beams 224 are connected to a link 301. The link 301 is provided at one end with a nut 302 and is slidable in the vertical slot 292 of the member 290. The lower end of the link 301 is connected to a pair of toggle links 303 and 304. The toggle link 304 is connected to a movable arm 305 and the toggle link 303 is connected to a stationary plate member 306. A link 307 is also pivotally connected to the toggle link 304 and the movable arm 305. The other end of the link 307 is connected to a pivoted arm 308, which has at its upper end a mercury switch 309. The movable arm 305 is connected at one end to a spring 310 which in turn is connected to a cord 311 wound upon a ratchet mechanism 312. The ratchet mechanism 312 is of conventional design and merely is for the purpose of adjusting the tension of the spring 310. The plate member 306 has a number of indices thereon which may be aligned with a pointer 314 connected to the spring 310. The ensilage removal mechanism delivers the material to an ensilage feeding mechanism 320 and hopper 321 which conveys it to the movable manger belt 30.

Figure 11:
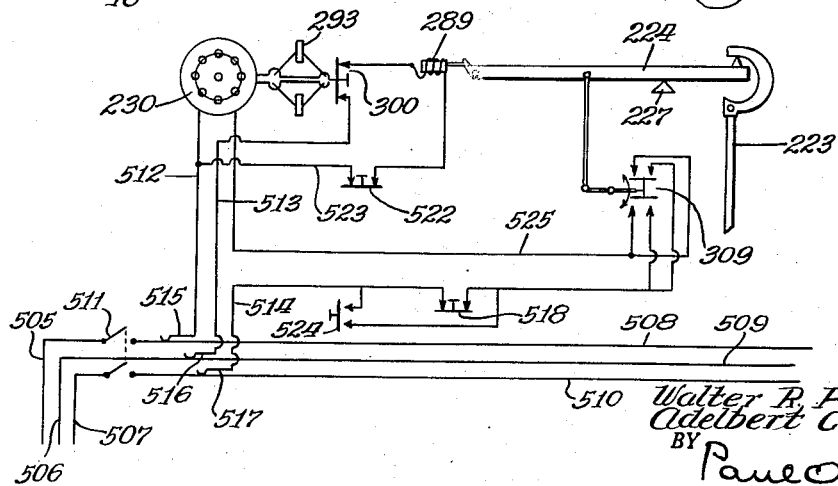
Fig. 11 is a wiring diagram for the ensilage removal mechanism.

As shown in the wiring diagram Figure 11, wires 505, 506 and 507 lead to an electrical feed rail 508, 509 and 510. Current to the electrical feed rail may be broken by means of a manual switch 511 which is mounted on the control box 500. Wires 512, 513 and 514 are connected at one end to respective contacts 515, 516 and 517 which are energized from the feed rails 508, 509 and 510. The wire 512 extends to a terminal on the motor 230. The wire 513 extends to the mercury switch 300 which is pivoted on the ensilage elevating mechanism as shown in Figure 15. Wire 514 extends to a two-way switch 309 which is pivoted on the ensilage elevating mechanism also shown in Figure 15.

A two point break switch 518 is connected in the circuit shown by wire 514. The switch 518 is mounted on the hopper guide members 212 by means of a bracket 519 as shown in Figure 4. The switch is pivoted as indicated at 520 upon guide member 212. A stop 521 is fastened to a portion of the side wall of the silo and is arranged so that it may engage and trip the mercury switch 518. In the position indicated in Figure 4 the mercury switch 518 is in an "off" position. A two-way break switch 522 is also connected in series with the switch 518 and is actuated simultaneously with the bracket 519. A wire 523 is connected at one end to the wire 512 and at its other end to the solenoid 289, as best shown in Figure 11.

A switch 524 is also provided in the circuit indicated by wire 514. The switch 524 may be located anywhere within the silage room for ready access to the operator. The switch 309 has connected, at one of its ends, a wire 525 which extends to the motor 230.

Operation

Before the manger belt 31 is set into operation for conveying feed adjacent the feeding end of the stalls, it is necessary that a predetermined amount of ensilage first be removed from the trench silo and deposited in the ensilage feeding mechanism 320. After the daily feeding operation, or at such time most convenient to the farmer, he generally operates the ensilage elevating mechanism to make certain that sufficient ensilage is dumped into the feeding mechanism ready for the next day's feeding. The procedure and operation of the ensilage elevating mechanism in the removal of ensilage from the trench silo will now be described as a preliminary before the feeding operation begins.

In an accurate feeding operation the farmer determines the amount of ensilage necessary for his herd. He thereupon can adjust the ensilage removal mechanism to fill the feeding mechanism 320 to the required quantity of ensilage. After noting the total amount of ensilage needed it is necessary to manually set the ratchet mechanism 312 of the silage weighing device thereby adjusting the tension of spring 310 in order to control the movement of the scale beams 224 so that the predetermined amount of ensilage will be collected and delivered to the ensilage feeding mechanism. Supposing that the eight cows require 200 pounds of feed, the pointer 314 would be placed opposite the indice #200 on the plate member 306. When he has thus determined what the total requirements are for the eight cows to be fed, the farmer adjusts the ratchet mechanism 312, Figure 6, to tension the spring 310 to a required tension. This tension is determined by setting the pointer 314 opposite the indice #200 on the plate member 306 as mentioned above. Having thus set the weighing mechanism in its proper indication, the farmer is ready to actuate the elevating mechanism.

The farmer manually closes switch 511, thereby energizing the feed rail for the silage elevator. As the feed rails 508, 509, and 510 are energized the electric motor 230 begins operating. As this motor is rotating the driven wheels 195 drive the ensilage removal and carrier mechanism 191 toward the packed ensilage. The scraper members 210 of the elevating mechanisms are moving upwardly, and as the carrier mechanism approaches the ensilage, the scraper elements are brought into engagement with the ensilage. As has previously been described, the ensilage is packed within the trench silo in layers of various types of feed. The scraper members 210 remove vertical sections of the ensilage. Thus each hopper full of ensilage contains a blend of the various layers of silage packed within the trench silo.

The scraper members 210 elevate the ensilage and dump the same into the hopper 213. The hopper 213 is vertically movable as carried by the links 223. As a certain amount of ensilage, in this instance 200 pounds, is packed within the hopper 213, the scale beams 224 start to pivot on the brackets 227.

As best shown in Figures 6 and 7, the inner adjacent ends of the scale beams move upwardly. As these scale beams move upwardly, the link 301 moves upwardly in the slot 292 of the bracket 290. The toggle links 303 and 304 also move upwardly, causing the switch 309 to rotate breaking electrical contact. As the switch 309 is broken, the rotation of the motor 230 stops and the elevating scraper mechanism and movement of the ensilage removal mechanism is stopped.

In the previous operating position the clutch member 238 was in engagement with the V-belt pulley 237 thereby driving the mechanism forwardly into the ensilage. It is now desired to shift the clutch element 238 into engagement with the pulley 244, thereby reversing the driving mechanism so that the ensilage remover and carrier mechanism is driven rearwardly to a position above the ensilage feeding mechanism 320 as best shown in Figure 4.

The centrifugally operable switch 293 is now in the position shown in Figure 6. The centrifugal weights 294 have come to rest in an inward position and the pivoted member 297 is in a vertical position in contact with the bracket 298. The mercury switch 300 as shown in Figure 6 is in an angular position and electric contact is made, thus energizing solenoid 289. Solenoid 289 unlocks the toggle links 287, and 288 and bracket 284 moves about its pivotal point 291. As the bracket 284 is pivoted about its pivotal point, a link 283 shifts the clutch member 238, the clutch face 242 of said member thus engaging clutch face 243 of the pulley 244. The shaft 234 is thereupon connected to the pulley 244 for driving the ensilage remover and carrier mechanism 191 in a reverse direction. The bracket 290 by virtue of its connection to the arm 284 and the link 287 has been forced upwardly, by the scale beams 224, in turn also moving the links 303 and 304 upwardly past a horizontal position. The links 303 and 304 actually are moved upwardly to the dotted line position indicated by 303' in Figure 6. By movement of the links 303 and 304 to this position the mercury switch 309 is again moved to an "on" position, thereby actuating the motor 230 to start movement of the ensilage removal and carrier mechanism 191.

The ensilage removal and carrier mechanism 191 now is driven rearwardly. The hopper 213 moves to a position in alignment with the ensilage feeding mechanism 320. At this position a stop 521 is engaged by the arm 519. The arm 519 is pivoted, thereby tilting the mercury switch 518 to an "off" position, whereupon the motor 230 comes to rest.

As best shown in Figure 10, as the hopper 213 comes to rest above the ensilage feeding mechanism 320, a projecting member 220 of the latch mechanism 216 engages an angle member which is a part of the hopper 321. The slidable member 217 is thereupon moved so that the hook portion 218 is removed from the slot 219 of an angle member forming a part of the hopper 213. The door bottom 214 is now free to pivot downwardly about pivot 215 and the ensilage thereupon is dumped into the ensilage feeding mechanism 320. The door 214, best shown in Figure 4, in its down position drops into vertical alignment with the low side wall 323, thereby forming one side of the hopper 321.

When the arm 519 engages the stop 521, a switch 522 is also actuated to open up the circuit 523 going to the solenoid 289. Since the predetermined amount of ensilage is now within the feeding mechanism 320 the feeding units of the barn can be placed into operation. When it is desired to again start the operation of the ensilage removal and carrier mechanism 191, the clutch parts 238, the arm 284, the scale beams 229, and the toggle links 303 and 304 are manually reset, whereupon the cycle of operation may be repeated.

The operator may now wish to have sufficient ensilage on hand for the subsequent feeding, wherefore he presses the elevator "on" switch 511. Since the hopper 213 is still positioned above the ensilage feeding mechanism 320 the switch 518 is in an "off" position. He thereupon also manually actuates the switch 524 which causes the motor 230 to operate, thereby driving the ensilage elevating mechanism forwardly and away from the stop 521. The switch 518 is thereupon again energized and the cycle of operation is continued as previously above described.

It can be seen that a novel mechanism has been provided for removing ensilage from a trench silo, the arrangement being such that a minimum amount of supervision is required by the operator.

What is claimed is:

1. The combination with a trench silo, of means for removing ensilage from the silo including, a supporting structure arranged to move horizontally with respect to the silo, an endless movable belt supported on said supporting structure, said belt being movable in a vertical direction substantially parallel to a vertical surface formed by one end of the ensilage, said belt extending downwardly substantially near the floor of the silo, scraper elements connected to said belt, said scraper elements being arranged to move upwardly thereby removing portions of the ensilage and conveying the same to the upper end of the silo, a container for receiving the ensilage from said scraper elements, means connecting said container to the supporting structure for movement therewith, power means for moving said supporting structure and said scraper elements into engagement with said ensilage, and means constructed and arranged to automatically reverse the horizontal movement of said supporting structure, thereby moving said scraper elements out of engagement with the ensilage upon the loading of said container to a predetermined capacity.

2. The combination with a trench silo, of means for removing ensilage from the silo including, a supporting structure arranged to move horizontally with respect to the silo, an endless movable belt supported on said supporting structure, said belt being movable in a vertical plane substantially parallel to a vertical surface formed by one wall of the ensilage, scraper elements connected to said belt, said scraper elements being arranged to move upwardly thereby removing portions of the ensilage and conveying the same to the upper end of the silo, a container for receiving the ensilage from said scraper elements, means connecting said container to the supporting structure for movement therewith, power means for moving said supporting structure and said scraper elements into engagement with said ensilage, and a weighing mechanism constructed and arranged to automatically stop and reverse the horizontal movement of said supporting structure, thereby moving said scraper elements out of engagement with the ensilage upon the loading of said container to a predetermined capacity.

3. The combination with a trench silo, of means for removing ensilage from said silo including a supporting structure, means movably supporting said supporting structure for longitudinal movement with respect to said silo, an elevator mechanism supported by said supporting structure, said elevator mechanism being arranged to engage and remove vertical sections of the silage, a receiving hopper arranged to receive ensilage from said elevator mechanism, power means arranged to move said elevator into engagement with the ensilage, and a reversing mechanism automatically operable with said power means and arranged and constructed to reverse movement of said supporting means in a direction away from said ensilage, upon the loading of said hopper to a predetermined capacity, thereby disengaging said elevator mechanism from said ensilage.

4. The combination with a trench silo, of means for removing ensilage from said silo including a supporting structure, means movably supporting said supporting structure for longitudinal movement with respect to said silo, an elevator mechanism supported by said supporting structure, said elevator mechanism being arranged to engage and remove vertical sections of the silage, a receiving hopper supported on said supporting structure and arranged to receive ensilage from said elevator mechanism, power means arranged to move said elevator into engagement with the ensilage and a reversing mechanism automatically operable with said power means and arranged and constructed to reverse movement of said supporting means in a direction away from said ensilage, upon the loading of said hopper to a predetermined capacity, thereby disengaging said elevator mechanism from said ensilage.

5. In combination with a trench silo, of means for removing ensilage from said silo including a supporting structure, means movably supporting said supporting structure for longitudinal movement with respect to said silo, an elevator mechanism supported by said supporting structure, said elevator mechanism being arranged to engage and remove vertical sections of the silage, a receiving hopper arranged to receive ensilage from said elevator mechanism, power means arranged to move said elevator into engagement with the ensilage and a reversing mechanism including a weight responsive mechanism automatically operable with said power means and arranged and constructed to reverse movement of said supporting means in a direction away from said ensilage, upon the loading of said receiving hopper to a predetermined capacity, thereby disengaging said elevator mechanism from said ensilage.

6. The combination with a trench silo for containing ensilage, of means for removing ensilage from said silo comprising an elevating mechanism including an endless belt, said belt including ensilage elevating members arranged to engage and remove sections of ensilage from a vertical face of ensilage, power means for moving said belt and said ensilage elevating members upwardly, a hopper connected to said elevating mechanism for receiving said ensilage from the ensilage elevating members, power means for continually moving said elevating mechanism horizontally toward said ensilage, reversing mechanism for said elevating mechanism, said reversing mechanism including a weight responsive mechanism constructed and arranged to automatically reverse the direction of horizontal movement of said elevating mechanism upon the loading of said hopper to a predetermined capacity, a stationary hopper arranged to receive the ensilage from the hopper on said elevating mechanism, means adjacent said stationary hopper arranged to automatically stop horizontal movement of said elevating mechanism when said elevating mechanism reaches a predetermined position, and a releasable door mechanism on said elevating hopper, said mechanism including a latch automatically operable to release said door for dumping ensilage into said stationary hopper.

7. The combination with a trench silo for containing silage, of means for removing ensilage from said silo comprising an elevating mechanism including an endless belt, said belt including ensilage elevating members arranged to engage and remove sections of ensilage from a vertical face of ensilage, power means for moving said belt and said ensilage elevating members upwardly, a hopper connected to said elevating mechanism for receiving said ensilage from the ensilage elevating members, power means for continuously moving said elevating mechanism horizontally toward said ensilage, reversing mechanism for said elevating mechanism, said reversing mechanism including a weight responsive mechanism constructed and arranged to automatically reverse the direction of horizontal movement of said elevating mechanism upon the loading of said hopper to a predetermined capacity, a stationary hopper arranged to receive the ensilage from the hopper on said elevating mechanism, and means adjacent said stationary hopper arranged to automatically stop horizontal movement of said elevating mechanism.

8. The combination with a trench silo for containing ensilage, of means for removing ensilage from said silo comprising an elevating mechanism including an endless belt, said belt including ensilage elevating members arranged to engage and remove sections of ensilage from a vertical face of ensilage, power means for moving said belt and said ensilage elevating members upwardly, a hopper connected to said elevating mechanism for receiving said ensilage from the ensilage elevating members, power means for continuously moving said elevating mechanism horizontally toward said ensilage, reversing mechanism for said elevating mechanism, said reversing mechanism including a weight responsive mechanism constructed and arranged to automatically reverse the direction of horizontal movement of said elevating mechanism upon the loading of said hopper to a predetermined capacity, a stationary hopper arranged to receive the ensilage from the hopper on said elevating mechanism, and means adjacent said stationary hopper arranged to automatically stop horizontal movement of said elevating mechanism.

9. The combination with a trench silo for containing ensilage, of means for removing ensilage from said silo comprising an elevating mechanism including an endless belt, ensilage elevating members on said belt arranged to engage and remove sections of ensilage from a vertical face of ensilage, a hopper connected to said elevating mechanism for receiving ensilage, power means for moving said belt and said ensilage elevating members vertically, power means for moving said elevating mechanism horizontally toward said ensilage, reversing mechanism for said elevating mechanism, said reversing mechanism including a weight responsive mechanism constructed and arranged to automatically reverse the direction of horizontal movement of said elevating mechanism upon the loading of said hopper to a predetermined capacity.

References Cited in the file of this patent

UNITED STATES PATENTS

| Number | Name | Date |
|---|---|---|
| 238,304 | Osterberg | Mar. 1, 1881 |
| 632,171 | Bolinski | Aug. 29, 1899 |
| 719,119 | Hurry et al. | Jan. 27, 1903 |
| 730,275 | Laswell | June 9, 1903 |
| 854,626 | Blaisdell | May 21, 1907 |
| 892,593 | Keller | July 7, 1908 |
| 897,942 | Wangelin | Sept. 8, 1908 |
| 1,207,983 | Newhouse | Dec. 12, 1916 |
| 1,385,126 | Gaston | July 19, 1921 |
| 1,437,004 | Neumann | Nov. 28, 1922 |
| 1,479,990 | Keys | Jan. 8, 1924 |
| 1,518,664 | Maryott | Dec. 9, 1924 |
| 1,970,291 | Everhard | Aug. 14, 1934 |
| 2,302,314 | Haggart | Nov. 17, 1942 |
| 2,310,592 | Noble | Feb. 9, 1943 |
| 2,331,724 | Plant | Oct. 12, 1943 |
| 2,358,000 | Cornell | Sept. 12, 1944 |
| 2,518,601 | Cordis | Aug. 15, 1950 |